United States Patent [19]

Inzoli

[11] 4,346,422
[45] Aug. 24, 1982

[54] POWER-DISTRIBUTION NETWORK FOR TELECOMMUNICATION SYSTEM

[75] Inventor: Luciano Inzoli, Lodi, Italy

[73] Assignee: Italtel Societa Italiana Telecomunicazioni S.p.A., Milan, Italy

[21] Appl. No.: 237,673

[22] Filed: Feb. 24, 1981

[30] Foreign Application Priority Data

Feb. 25, 1980 [IT] Italy .................. 20137 A/80

[51] Int. Cl.³ .......................................... H02H 7/26
[52] U.S. Cl. ................................. 361/62; 179/81 R
[58] Field of Search ................. 361/42, 49, 50, 103, 361/104, 105, 106, 92, 62, 63, 32; 307/66; 179/81 R

[56] References Cited

U.S. PATENT DOCUMENTS

| | | | |
|---|---|---|---|
| 3,041,515 | 6/1962 | Vaughan | 361/32 X |
| 3,873,887 | 3/1975 | Barkan et al. | 361/63 X |
| 4,117,526 | 9/1978 | Bates | 361/92 |
| 4,132,860 | 1/1979 | Rasmussen | 179/81 R |

FOREIGN PATENT DOCUMENTS 2057571 6/1972 Fed. Rep. of Germany .

Primary Examiner—Reinhard J. Eisenzopf
Attorney, Agent, or Firm—Karl F. Ross

[57] ABSTRACT

A power-distribution network for the energization of a multiplicity of loads comprises a two-conductor trunk extending from a DC supply, a plurality of parallel primary branches connected to the trunk via respective first overload-responsive circuit breakers, and a plurality of parallel secondary branches connected to each primary branch via respective second overload-responsive circuit breakers. Each secondary branch terminates at one or more DC/AC converters feeding associated loads, the converter frequencies being suppressed in the supply network by filters included in the second circuit breakers. Each circuit breaker further includes at least one capacitor which, in the event of a short circuit in a parallel branch, supplies the associated loads for a time long enough to let the supply voltage substantially recover its normal value.

7 Claims, 3 Drawing Figures ically the case in telephone exchanges and the like, DC/AC converters must be inserted between these loads and corresponding lines of the distribution network. To prevent any objectionable retroaction of the chopping frequencies of the converters upon the distribution network, suitable low-pass or band-stop filters should be provided upstream of the converters to suppress these frequencies.

POWER-DISTRIBUTION NETWORK FOR TELECOMMUNICATION SYSTEM

FIELD OF THE INVENTION

My present invention relates to a power-distribution network for the energization of a multiplicity of loads, especially in a telecommunication system such as a telephone exchange with electronic switches.

BACKGROUND OF THE INVENTION

In many instances, such a power-distribution network must conform to an existing layout of switches or other loads to be energized thereby and thus must allow for widely varying distances between these loads and the power source. In the event of a breakdown, such as a short circuit or a ground fault, the affected part of the network must be quickly isolated from the remainder and must be limited in its extent so as to insure continued operation of as many loads as possible. Moreover, the isolated network part should be readily accessible for repair and restoration to service.

When loads require alternating current for their operation but the power supply is a DC source, as is generally the case in telephone exchanges and the like, DC/AC converters must be inserted between these loads and corresponding lines of the distribution network. To prevent any objectionable retroaction of the chopping frequencies of the converters upon the distribution network, suitable low-pass or band-stop filters should be provided upstream of the converters to suppress these frequencies.

The installation of overload-responsive circuit breakers at strategic points of a power-distribution network helps localize the effects of a fault. This, however, does not prevent a temporary drop in the supply voltage due to a current surge caused by a short circuit in the network. Especially with loads remote from the source, whose supply lines are relatively long so as significantly to delay the restoration of the input voltage to its normal level, the resulting interruption of operating current may be highly detrimental.

OBJECTS OF THE INVENTION

The general object of my present invention, therefore, is to provide an improved power-distribution network which satisfies the requirements of safety, accessibility and localization of faults while maintaining the supply of energy to loads not directly affected by a short circuit occurring somewhere in the network.

Another object is to provide means in such an improved distribution network for effectively filtering out chopping frequencies generated in DC/AC converters through which one or more loads are energized.

SUMMARY OF THE INVENTION

A power-distribution network according to my invention comprises a trunk line connected to a supply of direct current, a plurality of primary branch lines connected in parallel to the trunk line via respective first circuit breakers responsive to short circuits in the associated primary branch lines, and a plurality of sets of secondary branch lines each feeding one or more loads, the branch lines of each set being connected in parallel to one of the primary branch lines via respective second circuit breakers that are responsive to short circuits in the associated secondary branch lines. Each circuit breaker has interrupter contacts in series with a conductor of the associated primary or secondary branch line and further has energy-storing means for maintaining at least a predetermined minimum level of energization for any load served thereby over a predetermined recovery period immediately following the occurrence of a short circuit in any parallel (primary or secondary) branch line and to enable substantial restoration of a normal supply voltage in the associated branch line.

As more particularly described hereinafter, the energy-storing means in each circuit breaker preferably comprises a capacitor connected between a high-voltage conductor containing the aforementioned interrupter contacts and a neutral conductor forming part of the associated primary or secondary branch line. The capacitor of a circuit breaker heading a secondary branch line advantageously forms part of a blocking filter which also includes inductance elements in the high-voltage and neutral conductors of that branch line and which serves to suppress the operating (chopping) frequency of a DC/AC converter connected thereto.

BRIEF DESCRIPTION OF THE DRAWING

The above and other features of my present invention will now be described in detail with reference to the accompanying drawing in which.

SPECIFIC DESCRIPTION

Figure 1:
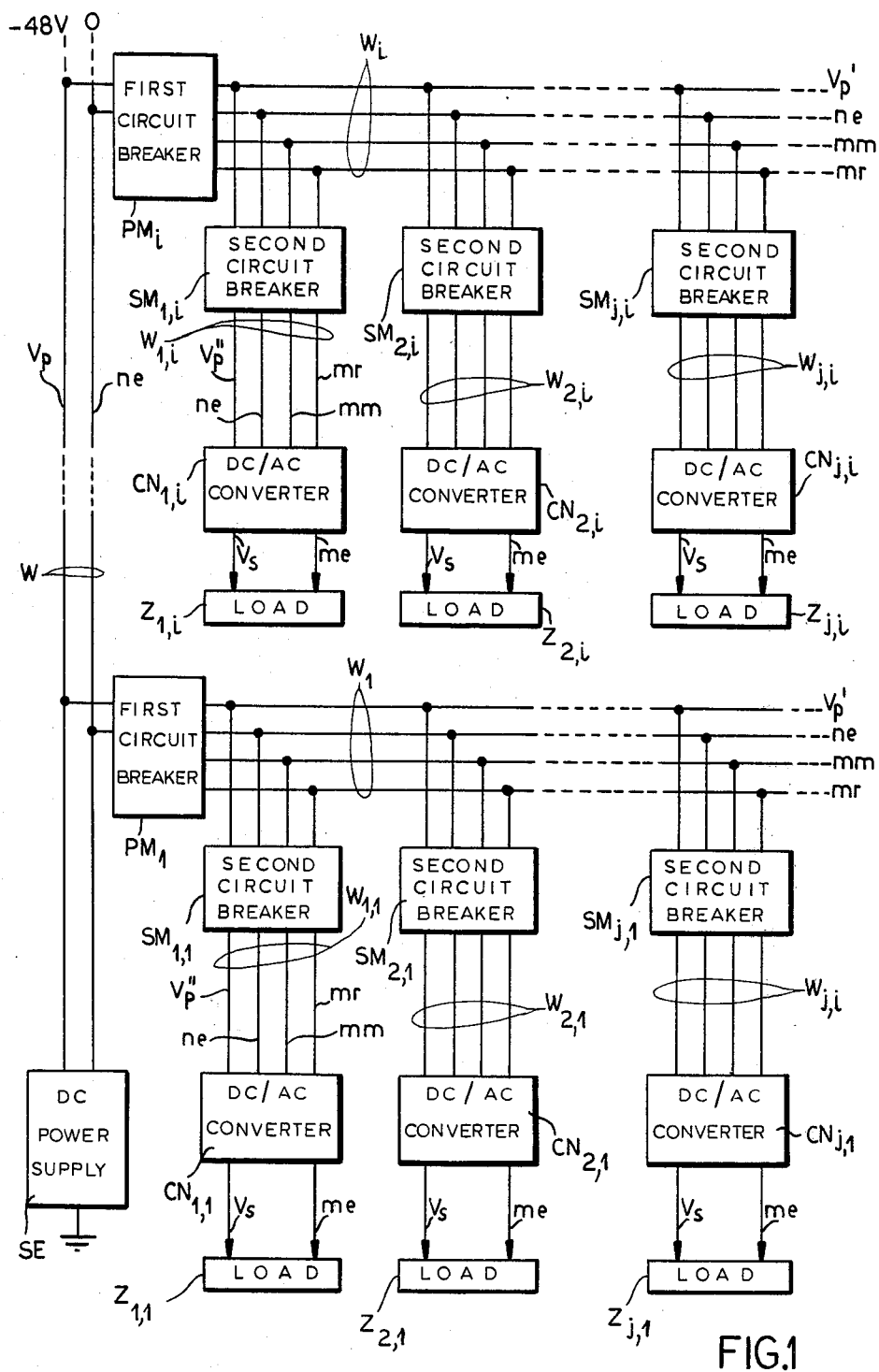
FIG. 1 is a block diagram of a power-distribution network embodying my invention.

FIG. 1 shows a DC power supply SE, e.g. a battery, with positive and negative poles respectively connected to a neutral conductor ne and a high-voltage conductor Vp forming part of a trunk line W. Conductor Vp is assumed to carry a voltage of $-48$ V whereas conductor ne is at ground potential.

A number of primary branch lines $W_1 \ldots W_i$ are connected in parallel to trunk line W by way of respective first circuit breakers $PM_1 \ldots PM_j$. Secondary branch lines $W_{1,1}, W_{2,1} \ldots W_{j,1}$ are connected in parallel to primary branch line $W_1$ via respective secondary circuit breakers $SM_{1,1}, SM_{2,1} \ldots SM_{j,1}$. Similarly, secondary branch lines $W_{1,i}, W_{2,i} \ldots W_{j,i}$ are connected in parallel to primary branch line $W_i$ by way of respective second circuit breakers $SM_{1,i}, SM_{2,i} \ldots SM_{j,i}$. Intervening primary branch lines and corresponding sets of secondary branch lines have not been illustrated.

Each secondary branch line terminates at a respective DC/AC converter $CN_{1,1}, CN_{2,1} \ldots CN_{j,1}$ and $CN_{1,i}, CN_{2,i} \ldots CN_{j,i}$ supplying a load or group of loads $Z_{1,1}, Z_{2,1} \ldots Z_{j,1}$ and $Z_{1,i}, Z_{2,i} \ldots Z_{j,i}$ with alternating current. The loads may be considered mounted on respective frames arrayed in rows parallel to branch lines $W_1-W_i$. Thus, primary lines $W_1-W_i$ and secondary lines $W_{1,1}-W_{j,i}$ may be referred to as row and frame buses, respectively.

Each primary line comprises a high-voltage conductor $V_p'$ which is an extension of trunk conductor $V_p$ and can be disconnected therefrom by the associated first circuit breaker in the event of a short circuit occurring downstream of the latter. Similarly, each secondary line has a high-voltage conductor $V_p''$ which forms an extension of conductor $V_p'$ of the corresponding primary line and can be disconnected therefrom by the associated second circuit breaker in the event of a short circuit occurring farther down the line, e.g. in the converter or in one of its loads. Neutral conductor ne of trunk W has integral extensions bearing the same reference in both the primary and the secondary branch lines. Each primary branch line $W_1 \ldots W_i$ further includes a reference conductor mr and a ground lead mm which are connected within the associated first circuit breaker to the neutral conductor ne, as described hereinafter with reference to FIG. 2, and which have integral extensions forming part of the several secondary branch lines. Each DC/AC converter is connected to its load or loads by a high-voltage lead Vs and a neutral lead me extending from a secondary winding of a nonillustrated transformer whose primary winding is connected across conductors Vp″ and ne through a chopper as is well known in the art.

Figure 2:
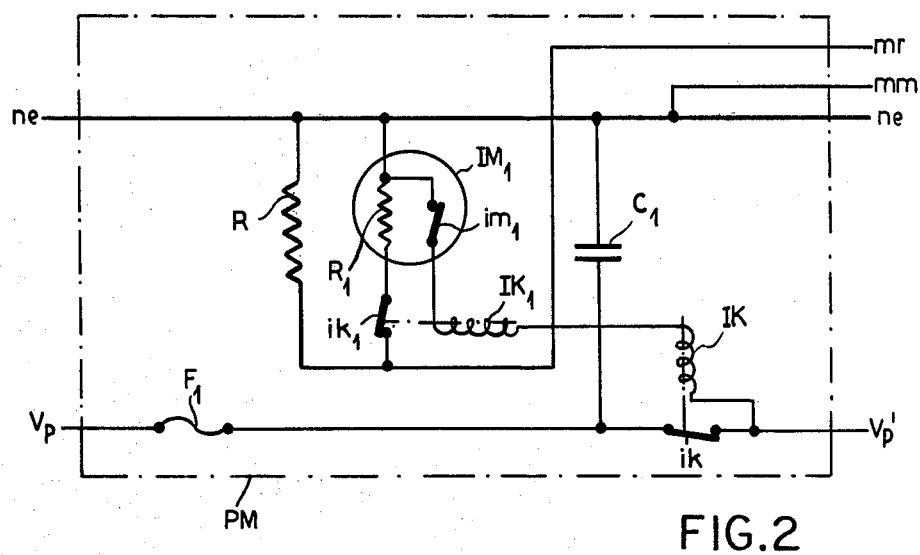
FIG. 2 shows details of a first circuit breaker included in the network of FIG. 1.

FIG. 2 illustrates a first circuit breaker PM representative of any one of the circuit breakers $PM_1$–$PM_j$ shown in FIG. 1. This circuit breaker comprises a conventional thermomagnetic overload sensor $IM_1$ including a bimetallic switch $im_1$ juxtaposed with a resistor $R_1$ and connected in series with high-resistance coils IK and $IK_1$ between neutral conductor ne and high-voltage conductor Vp′. Resistor $R_1$ forms part of a conductive link which connects neutral conductor ne to reference conductor mr and which also includes contacts $ik_1$ that lie in series with this resistor and are normally held closed by coil $IK_1$. Coil IK normally closes interrupter contacts ik lying in series with a fuse $F_1$ between conductors Vp and Vp′. Conductor mr serves as a reference ground connected by way of the corresponding set of secondary branch lines to the neutral leads me of the respective loads served thereby. Lead mm, tied directly to neutral conductor ne, grounds the load frames for safety reasons and carries no current.

Resistor $R_1$ and contacts $ik_1$ are shunted by a resistor R maintaining electrical continuity between conductors ne and mr when contacts $ik_1$ are opened by the overload sensor $IM_1$ in the event of a short circuit between conductors Vp′ and mr. Such a short circuit, as will be readily apparent, heats the bimetallic switch $im_1$ which on opening cuts off the coils IK and $IK_1$ whereby the corresponding contacts ik and $ik_1$ are opened by their nonillustrated biasing springs. When the short circuit has been eliminated, contacts ik may be manually reclosed to restore normal operating conditions.

In accordance with an important feature of my invention, a capacitor $C_1$ is connected across conductors ne and Vp (downstream of fuse $F_1$) to serve as an energy store designed to keep the associated converters supplied upon the occurrence of a short circuit in a parallel primary branch line (or in a secondary branch line connected thereto) which causes the potential of trunk conductor Vp to drop momentarily below an acceptable level. The charge of capacitor $C_1$ must suffice to prevent an excessive drop in the potential of the associated conductor Vp′ until the source SE (FIG. 1) again supplies the necessary energy.

Since the capacitance of source SE will generally be much larger than that of capacitor $C_1$, the recovery period T is essentially a cycle of the resonance frequency f determined by the capacitance C of capacitor $C_1$ and by the inductance L of the trunk line connecting source SE to circuit breaker PM, this frequency being given by:

$$f = \frac{1}{2\pi \sqrt{LC}} \quad (1)$$

whence:

$$T = \frac{1}{f} = 2\pi \sqrt{LC} \quad (2)$$

During discharge, the capacitor voltage decreases at a rate which in first approximation can be regarded as linear and proportional to the load current I. With a permissible maximum voltage loss $\Delta V$, period T must satisfy the relationship $$T = \frac{C \cdot \Delta V}{I} \quad (3)$$

Substituting the value of C from equation (3) in equation (2) yields:

$$T = 4\pi^2 L \frac{I}{\Delta V} \quad (4)$$

As long as the primary and secondary branch lines served by circuit breaker PM do not have any short circuit, the combined lead current I drawn by the associated converters will have a predetermined value. For a permissible maximum voltage reduction $\Delta V$, which generally is not more than 30% of the normal operating voltage or less than 15 V in the present instance, the capacitor $C_1$ of any first circuit breaker PM must be capable of keeping the loads energized for a time T depending only on the circuit inductance L as given by equation (4). Thus, the requisite magnitude of capacitance C can be determined for each circuit breaker PM according to equation (3).

Figure 3:
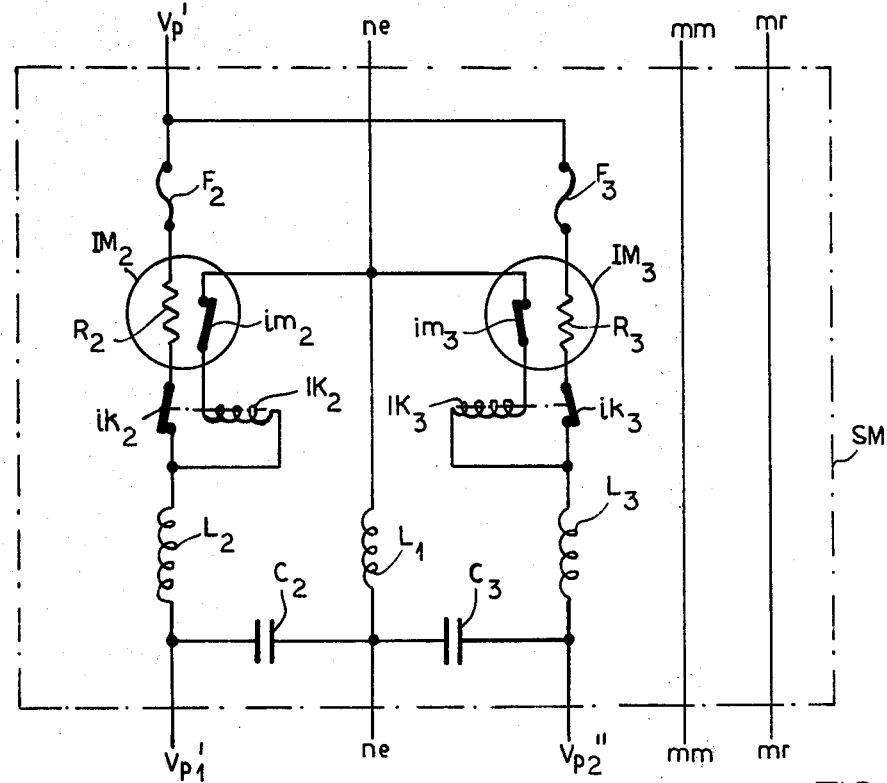
FIG. 3 shows details of a second circuit breaker forming part of that network.

FIG. 3 illustrates a second circuit breaker SM which is representative of any circuit breaker $SM_{1,1}$–$SM_{j,i}$ of FIG. 1 except for the presence of two outgoing high-voltage conductors Vp″$_1$ and Vp″$_2$ separated from incoming supply conductor Vp′ by respective fuses $F_2$ and $F_3$, overload sensors $IM_2$ and $IM_3$ with interrupter contacts $ik_2$ and $ik_3$ controlled by coils $IK_2$ and $IK_3$, and inductance elements $L_2$ and $L_3$ in series therewith. Another inductance element $L_1$ is inserted in neutral conductor ne. Two energy-storing capacitors $C_2$ and $C_3$ are connected between conductors Vp″$_1$ and Vp″$_2$, respectively, and neutral conductor ne downstream of inductance elements $L_1$–$L_3$. Sensors $IM_2$ and $IM_3$ are of the samme thermomagnetic type as sensor $IM_1$ shown in FIG. 2, with resistors $R_2$, $R_3$ and juxtaposed bimetallic switches $im_2$, $im_3$ which in the event of an overload open the energizing circuits of the high-resistance coils $IK_2$, $IK_3$.

Conductors Vp″$_1$ and Vp″$_2$ supply respective sections of the associated converter and thus serve for the energization of different loads whereby a short circuit in one load or converter section will let the remaining load or loads operate normally. Naturally, the number of parallel output circuits (including respective storage capacitors) of circuit breaker SM could also be made greater than two.

Capacitors $C_2$ and $C_3$ form antiresonant circuits with inductors $L_1$, $L_2$ and $L_1$, $L_3$, respectively, which serve to filter out the chopping frequencies of the corresponding converter sections. The requisite magnitudes of these capacitors can be determined from the foregoing equations, with the assumption that the capacitance of capacitor $C_2$ or $C_3$ is much smaller than that of capacitor $C_1$ of the first circuit breaker heading the corresponding primary branch line. Inductance L in equation (4) will have to take inductors $L_1$ and $L_2$ or $L_3$ together with the line inductance into account.

When a short circuit occurs between neutral conductor ne and one of the high-voltage conductors $Vp''_1$, $Vp''_2$, only the corresponding sensor $IM_2$ or $IM_3$ will respond. If, however, the short circuit involves the reference conductor mr, sensor $IM_1$ of the associated circuit breaker PM will also detect that condition but should not go into action as long as the corresponding sensor $IM_2$ or $IM_3$ operates properly. If these devices are all identical, the sensitivity of primary sensor $IM_1$ is reduced by the presence of shunt resistor R whose magnitude should be low enough—compared with that of resistors $R_2$, $R_3$—to keep the potential of the short-circuiting point and thus of conductor mr as close to zero as possible in order to enable continued operation of other loads supplied by the same primary branch line. Upon simultaneous occurrence of short circuits in a number of loads served by that line, however, contacts ik (and $ik_1$) will open to de-energize conductor $Vp'$.

I claim:

1. A power-distribution network for energizing a multiplicity of loads, comprising:
   a supply of direct current connected to a trunk line;
   a plurality of primary branch lines connected in parallel to said trunk line via respective first circuit breakers responsive to short circuits in the associated primary branch lines;
   a plurality of sets of secondary branch lines each feeding at least one load, the branch lines of each set being connected in parallel to one of said primary branch lines via respective second circuit breakers responsive to short circuits in the associated secondary branch lines;
   each of said circuit breakers being provided with interrupter contacts in series with a conductor of the associated branch line and with energy-storing means for maintaining at least a predetermined minimum level of energization for any load served thereby over a predetermined recovery period following the occurrence of a short circuit in any parallel branch line to enable substantial restoration of a normal supply voltage in the associated branch line, said energy-storing means including a capacitor connected in each circuit breaker between a high-voltage conductor containing said interrupter contacts and a neutral conductor forming part of the associated branch line; and
   chopper-type converters inserted between said secondary branch lines and said loads, each of said second circuit breakers including inductance elements in said high-voltage and neutral conductors thereof forming with the energy-storing capacitor thereof a filter blocking the chopping frequency of any converter connected to the respective secondary branch line.

2. A power-distribution network as defined in claim 1 wherein each branch line includes; besides said high-voltage and neutral conductors, a reference conductor connected at a corresponding first circuit breaker to the neutral conductor of the associated primary branch line by a conductive link containing an overload sensor controlling said interrupter contacts, said overload sensor being provided with additional contacts severing said conductive link concurrently with the opening of the corresponding interrupter contacts.

3. A power-distribution network as defined in claim 2, further comprising a shunt resistor inserted in parallel with said conductive link between said neutral and reference conductors.

4. A power-distribution network as defined in claim 1, 2 or 3 wherein said second circuit breakers include overload sensors in the high-voltage conductors of the associated secondary branch lines controlling said interrupter contacts in series therewith.

5. A power-distribution network as defined in claim 4 wherein the high-voltage conductors of at least some of said secondary branch lines are split into a plurality of parallel leads each including an overload sensor in the associated second circuit breaker, each of said leads being coupled with the corresponding neutral conductor through a respective energy-storing capacitor in the associated second circuit breaker.

6. A power-distribution network for energizing a multiplicity of loads, comprising:
   a supply of direct current connected to a trunk line;
   a plurality of primary branch lines connected in parallel to said trunk line via respective first circuit breakers responsive to short circuits in the associated primary branch lines; and
   a plurality of sets of secondary branch lines each feeding at least one load, the branch lines of each set being connected in parallel to one of said primary branch lines via respective second circuit breakers responsive to short circuits in the associated secondary branch lines;
   each of said circuit breakers being provided with interrupter contacts in series with a conductor of the associated branch line and with energy-storing means for maintaining at least a predetermined minimum level of energization for any load served thereby over a predetermined recovery period following the occurrence of a short circuit in any parallel branch line to enable substantial restoration of a normal supply voltage in the associated branch line, said energy-storing means including a capacitor connected in each circuit breaker between a high-voltage conductor containing said interrupter contacts and a neutral conductor forming part of the associated branch line;
   each branch line further including, besides said high-voltage and neutral conductors, a reference conductor connected at a corresponding first circuit breaker to the neutral conductor of the associated primary branch line by a conductive link containing an overload sensor controlling said interrupter contacts, said overload sensor being provided with additional contacts severing said conductive link concurrently with the opening of the corresponding interrupter contacts.

7. A power-distribution network as defined in claim 3, or 6 wherein each branch line further includes a ground lead connected at a corresponding first circuit breaker to the neutral conductor of the associated primary branch line.

* * * * *